(12) United States Patent
Woodworth et al.

(10) Patent No.: US 8,721,383 B2
(45) Date of Patent: May 13, 2014

(54) MODULAR MINIATURE UNMANNED AIRCRAFT WITH VECTORED THRUST CONTROL

(75) Inventors: Adam Woodworth, Melrose, MA (US); Brandon Suarez, Tampa, FL (US)

(73) Assignee: Aurora Flight Sciences Corporation, Manassas, VA (US)

( * ) Notice: Subject to any disclaimer, the term of this patent is extended or adjusted under 35 U.S.C. 154(b) by 947 days.

(21) Appl. No.: 12/556,225

(22) Filed: Sep. 9, 2009

(65) Prior Publication Data

US 2011/0057074 A1 Mar. 10, 2011

(51) Int. Cl.
*B64C 13/00* (2006.01)

(52) U.S. Cl.
USPC .................. 446/6; 446/58; 244/12.4; 244/56

(58) Field of Classification Search
USPC ..... 244/12.4, 17.23, 17.25, 7 R, 7 A, 7 C, 56, 244/51, 190; 446/58, 6, 57, 92, 93; 310/40 MM
See application file for complete search history.

(56) References Cited

U.S. PATENT DOCUMENTS

| | | | | |
|---|---|---|---|---|
| 3,201,071 A | * | 8/1965 | De Siebenthal | 244/56 |
| 3,757,461 A | * | 9/1973 | Chang et al. | 446/58 |
| 3,777,395 A | * | 12/1973 | Chang | 446/58 |
| 3,908,305 A | * | 9/1975 | Schroeder | 446/50 |
| 3,985,322 A | * | 10/1976 | Mabuchi et al. | 248/554 |
| 3,999,328 A | * | 12/1976 | Schroeder | 446/50 |
| 4,027,422 A | * | 6/1977 | Schroeder | 446/50 |
| 4,116,405 A | * | 9/1978 | Bacchi et al. | 244/12.4 |
| 4,149,688 A | * | 4/1979 | Miller, Jr. | 244/12.4 |
| 4,204,656 A | * | 5/1980 | Seward, III | 244/30 |
| 4,436,261 A | * | 3/1984 | Koleff | 244/51 |
| 4,496,120 A | * | 1/1985 | Eickmann | 244/56 |
| 4,591,114 A | * | 5/1986 | Block | 244/120 |
| 4,668,887 A | * | 5/1987 | D'Argouges et al. | 310/154.14 |
| 4,891,029 A | * | 1/1990 | Hutchinson | 446/58 |
| 5,087,000 A | * | 2/1992 | Suto | 244/189 |
| 5,419,514 A | * | 5/1995 | Ducan | 244/12.4 |
| 5,503,350 A | * | 4/1996 | Foote | 244/1 R |
| 5,823,468 A | * | 10/1998 | Bothe | 244/2 |
| 5,839,691 A | * | 11/1998 | Lariviere | 244/7 R |
| 6,048,247 A | * | 4/2000 | Kownacki et al. | 446/66 |
| 6,612,893 B2 | * | 9/2003 | Rehkemper et al. | 446/34 |
| 6,719,244 B1 | | 4/2004 | Gress | |
| 6,817,573 B2 | * | 11/2004 | Harrison et al. | 244/75.1 |
| 7,318,565 B2 | * | 1/2008 | Page | 244/63 |
| 7,918,707 B2 | * | 4/2011 | Amireh et al. | 446/58 |
| 8,133,089 B2 | * | 3/2012 | Amireh et al. | 446/58 |
| 8,141,819 B2 | * | 3/2012 | Brock | 244/120 |
| 8,256,714 B2 | * | 9/2012 | Zhao | 244/120 |

(Continued)

*Primary Examiner* — Tien Dinh
*Assistant Examiner* — Michael Kreiner
(74) *Attorney, Agent, or Firm* — Katten Muchin Rosenman LLP

(57) ABSTRACT

An aircraft for unmanned aviation is described. The aircraft includes an airframe, a pair of fins attached to a rear portion of the airframe, a pair of dihedral braces attached to a bottom portion of the airframe, a first thrust vectoring module and a second thrust vectoring module, and an electronics module. The electronics module provides commands to the two thrust vectoring modules. The two thrust vectoring modules are configured to provide lateral and longitudinal control to the aircraft by directly controlling a thrust vector for each of the pitch, the roll, and the yaw of the aircraft. The use of directly articulated electrical motors as thrust vectoring modules enables the aircraft to execute tight-radius turns over a wide range of airspeeds.

19 Claims, 16 Drawing Sheets

(56) References Cited

U.S. PATENT DOCUMENTS

| | | |
|---|---|---|
| 8,430,709 B1* | 4/2013 | Wong .............................. 446/34 |
| 2003/0197092 A1* | 10/2003 | Tian et al. ...................... 244/51 |
| 2005/0103943 A1* | 5/2005 | Tanielian ...................... 244/190 |
| 2005/0151023 A1* | 7/2005 | Ribbe ........................... 244/190 |
| 2006/0192047 A1 | 8/2006 | Goossen |
| 2006/0261213 A1* | 11/2006 | Lavan ............................ 244/30 |
| 2007/0018041 A1* | 1/2007 | Butler et al. ................... 244/105 |
| 2007/0029440 A1* | 2/2007 | Shepshelovich et al. ....... 244/13 |
| 2008/0223994 A1* | 9/2008 | Greenley ...................... 244/7 R |
| 2008/0265088 A1* | 10/2008 | Choi ............................... 244/55 |

\* cited by examiner

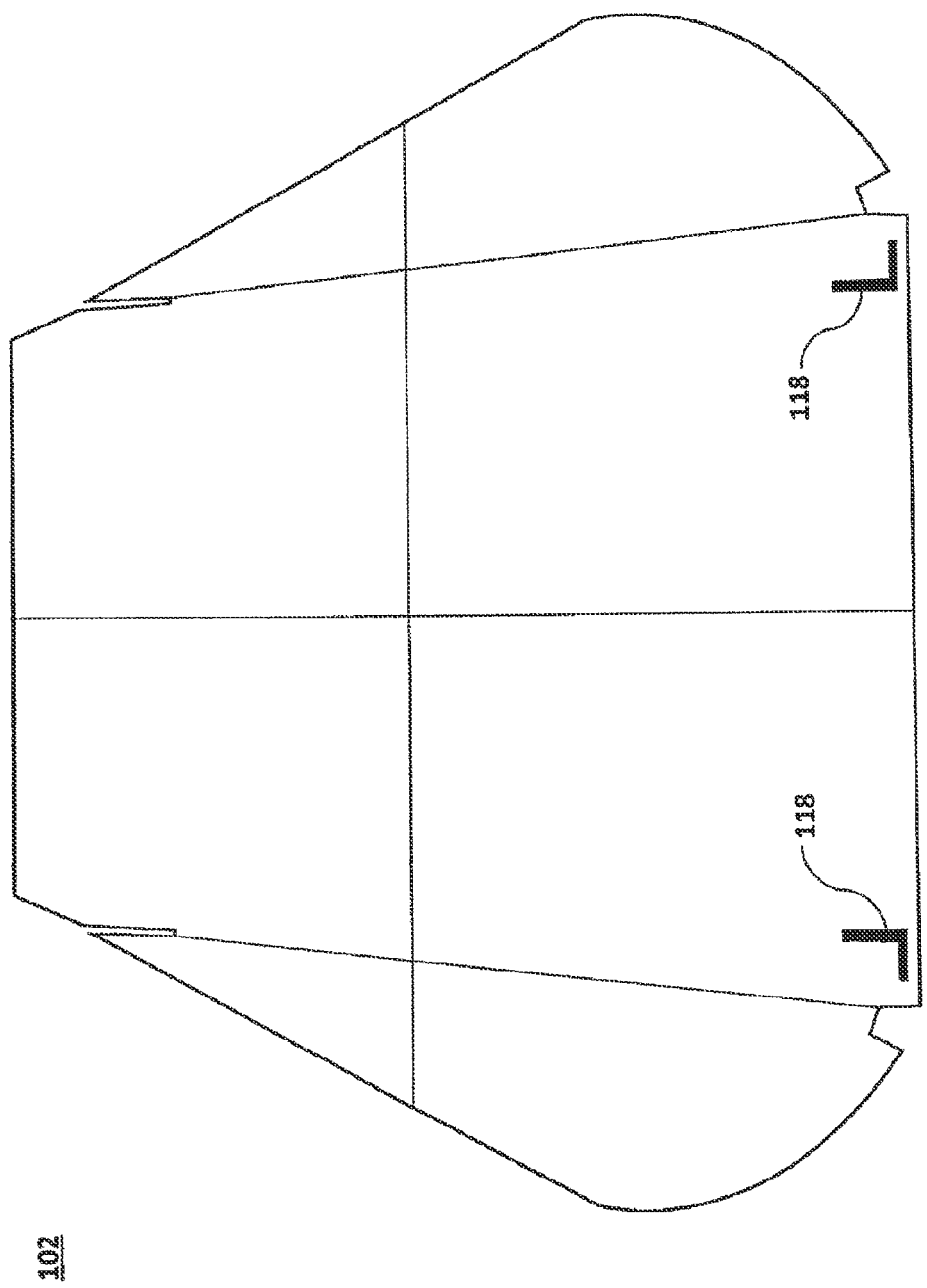

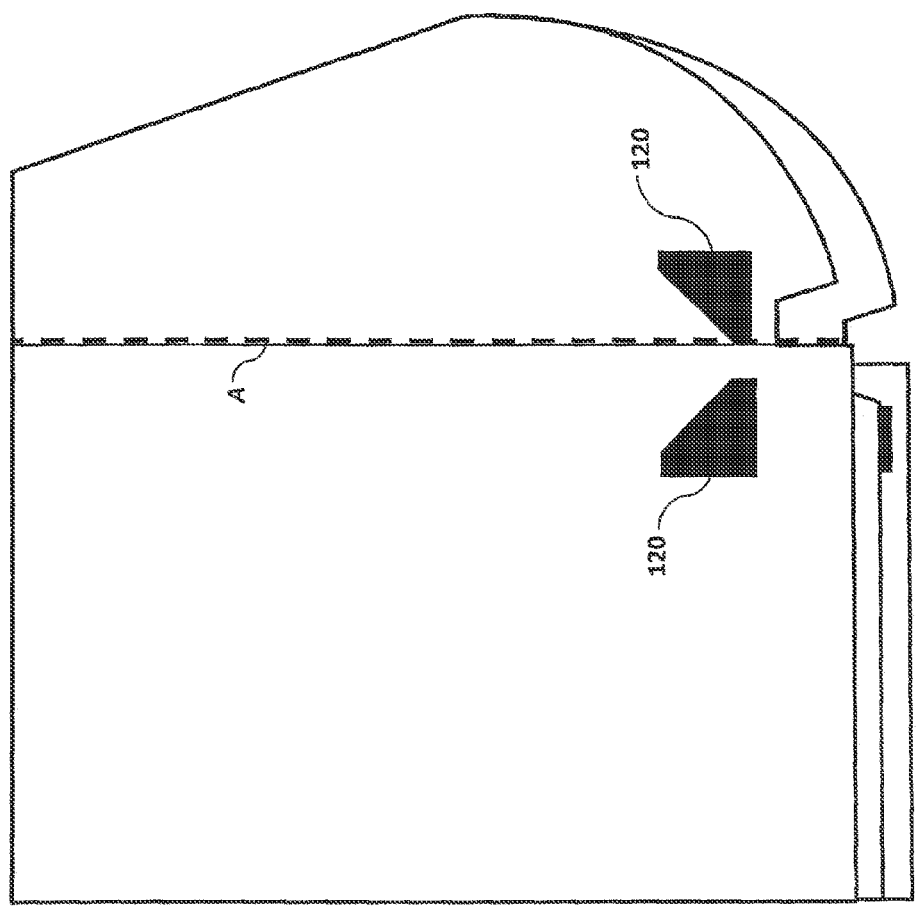

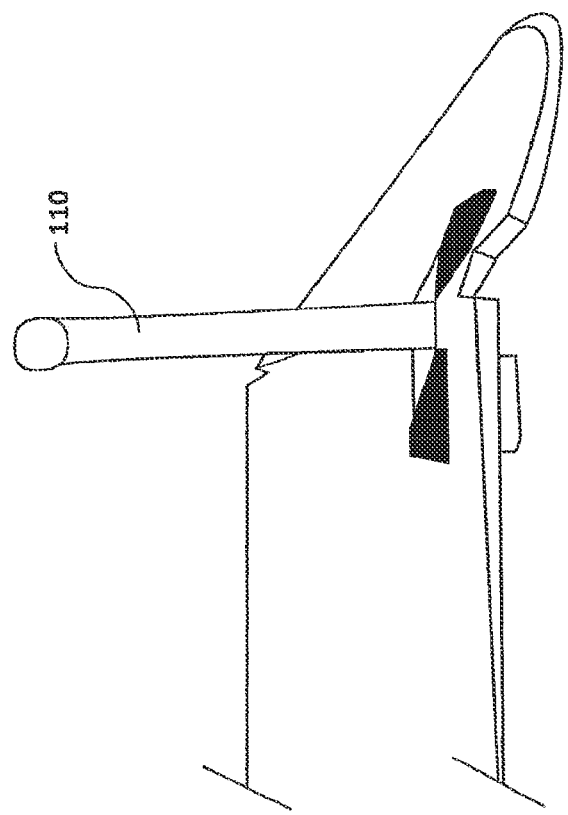
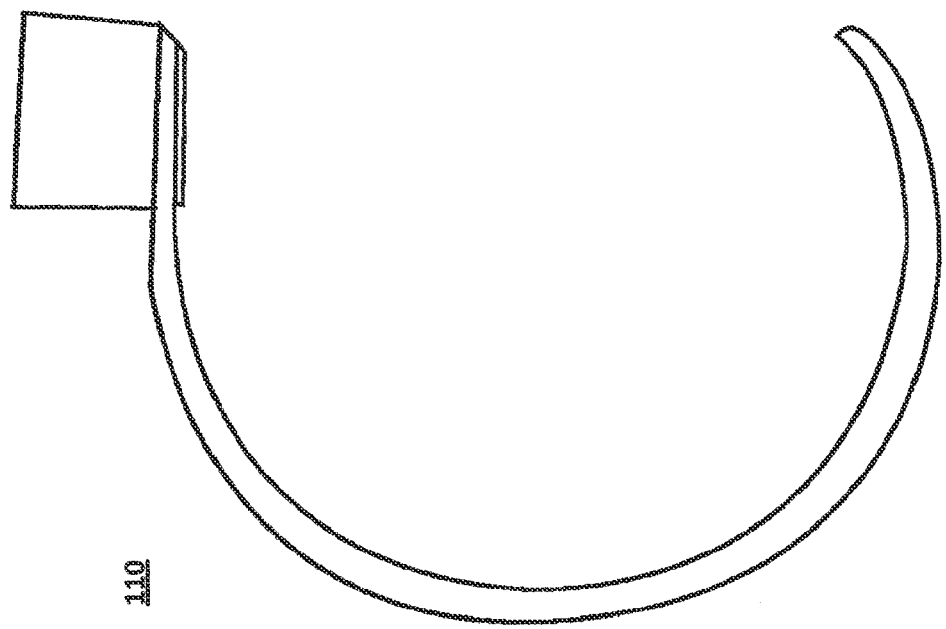
FIG. 8b
FIG. 8a

MODULAR MINIATURE UNMANNED AIRCRAFT WITH VECTORED THRUST CONTROL

BACKGROUND OF THE INVENTION

1. Field of the Invention

The present invention provides a miniature unmanned aircraft. More particularly, the present invention provides an aircraft that uses thrust vectoring modules to enable the aircraft to execute tight-radius turns at high angular rates over a wide range of speeds.

2. Related Art

The use of unmanned aerial vehicles (UAVs) has become important in recent years for a wide variety of applications, including military uses. In some applications, a UAV may be required to have a capability for maneuvering quickly or in tight spaces. Further, the UAV may be required to have this capability over a wide range of speeds.

Conventional fixed wing small UAVs generally lack the maneuvering capability and speed range that would be necessary for operating in an urban canyon. Generally, this is due to a reliance upon airflow over control surfaces derived from the forward airspeed of the vehicle. Vertical takeoff-and-landing (VTOL) aircraft have been used to address this maneuvering challenge at low speeds. For example, in U.S. Pat. No. 6,719,244, a VTOL aircraft uses lateral tilting of the propellers to induce unbalanced torque-induced and gyroscopic moments which act on the aircraft about an axis essentially perpendicular to the tilt axis. U.S. Patent Application Publication No. US 2006/0192047 discloses a hovering air vehicle that uses two ducted fans attached to a common drive housing. The vanes below each fan body can be tilted differentially or in unison to generate control forces. In one embodiment, fixed wings are attached to the ducts for forward flight capability.

However, in both of these instances, control forces are generated through secondary effects, either gyroscopic or aerodynamic. These control forces increase system complexity and limit achievable maneuverability. Therefore, the present inventors have recognized the need to develop an aircraft that has such a capability.

SUMMARY OF THE INVENTION

In one aspect, the invention provides an aircraft for unmanned aviation. The aircraft comprises: an airframe; a pair of fins attached to a rear portion of the airframe; a pair of dihedral braces attached to a bottom portion of the airframe; at least a first thrust vectoring module and a second thrust vectoring module, the at least two thrust vectoring modules being configured to provide lateral and longitudinal control to the aircraft by directly controlling a thrust vector; and an electronics module configured to provide commands to the at least two thrust vectoring modules. The at least two thrust vectoring modules may be further configured to independently control a pitch, a roll, and a yaw of the aircraft.

Each of the at least two thrust vectoring modules may comprise a directly articulated electrical motor. The airframe may be disposable and foldable into a compact, stowable configuration. The aircraft may be configured for executing tight-radius turns, including a turn having a radius of less than or equal to one wing span, at high angular rates of up to one rotation per second, over a wide range of airspeeds, including a range from zero to a maximum speed of the aircraft, and possibly including a post-stall condition. The airframe may comprise a mission-specific airframe, possibly based on an atmospheric condition or a weather condition.

In another aspect, the present invention provides a control system for controlling a flight path of an unmanned aerial vehicle. The control system comprises: at least a first thrust vectoring module and a second thrust vectoring module, and an electronics module. The electronics module is configured to provide commands to the at least two thrust vectoring modules based on instructions received from a user of the control system. The at least two thrust vectoring modules are configured to provide lateral and longitudinal control to the vehicle by directly controlling a thrust vector. The at least two thrust vectoring modules may be further configured to independently control a pitch, a roll, and a yaw of the vehicle.

Each of the at least two thrust vectoring modules may comprise a directly articulated electrical motor. The control system may be configured for enabling the vehicle to execute tight-radius turns, including a turn having a radius of less than or equal to one wing span, at high angular rates of up to one rotation per second over a wide range of airspeeds, including a range from zero to a maximum airspeed of the vehicle, and possibly including a post-stall condition.

In yet another aspect of the invention, a method for controlling a flight path of an unmanned aerial vehicle is provided. The method comprises the steps of: transmitting a control signal to an electronics module, the control signal including instructions for controlling a speed and a direction of the vehicle; causing the electronics module to provide a command to each of at least a first thrust vectoring module and a second thrust vectoring module; and causing each of the at least first thrust vectoring module and second thrust vectoring module to provide thrust such that the vehicle is laterally and longitudinally controlled. The step of causing each of the at least first and second thrust vectoring modules to provide thrust may further include causing each of the at least first and second thrust vectoring modules to independently control a pitch, a roll, and a yaw of the vehicle.

Each of the at least two thrust vectoring modules may comprise a directly articulated electrical motor. The step of causing each of the at least first thrust vectoring module and second thrust vectoring module to provide thrust such that the vehicle is laterally and longitudinally controlled may further comprise the step of enabling the vehicle to execute tight-radius turns, including a turn having a radius of less than or equal to one wing span, at high angular rates of up to one rotation per second over a wide range of airspeeds, including a range of zero to a maximum airspeed of the vehicle, and possibly including a post-stall condition.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIGS. 7a, 7b, 7c, and 7d illustrate a folding process for compactly packing a modular miniature unmanned aircraft with vectored thrust control according to a preferred embodiment of the present invention.

FIGS. 8a, 8b, 8c, and 8d illustrate a dihedral brace for use as a landing skid and locking element on a modular miniature unmanned aircraft with vectored thrust control according to a preferred embodiment of the present invention.

DETAILED DESCRIPTION OF THE INVENTION

The inventors of the present invention have developed a modular miniature unmanned aircraft with vectored thrust control to synergistically mesh sensor and aircraft capabilities into a system capable of navigating through highly cluttered urban environments. Whereas traditional force production techniques rely on airflow over control surfaces, the modular miniature unmanned aircraft with vectored thrust control employs articulated motors to directly change the thrust vector, including directly changing both the magnitude and the direction of the thrust vector. This allows the modular miniature unmanned aircraft to execute tight-radius high-angular-rate turns, over a wide speed range and in the post stall regime. In addition, the modular miniature unmanned aircraft features a low aspect ratio planform, which permits rapid deceleration/perch maneuvers, and permits benign controlled flight at large angles of attack. This feature provides the additional advantages of reduced system complexity and increased durability. Further, all of the moving parts of the modular miniature unmanned aircraft are preferably co-located in ruggedized pods, making the actual airframe a low-cost disposable element of the modular miniature unmanned aircraft system.

In a preferred embodiment, the modular miniature unmanned aircraft with vectored thrust control can execute a turn having a radius of less than or equal to one wing span. In one embodiment, the modular miniature unmanned aircraft can have an airspeed of zero with its nose pointing vertically, thereby operating in a hover mode, and then rotate about a vertical axis. In addition, when operating in the hover mode, the modular miniature unmanned aircraft can perform a pirouette maneuver at a rate of more than one rotation per second. The maximum angular rate of the modular miniature unmanned aircraft is generally a function of the forward airspeed, with the only limitation being equivalent to the physical limits associated with centrifugal forces at the given forward airspeed. All turning and rotating maneuvers of the modular miniature unmanned aircraft can be executed at any forward airspeed between zero and the maximum forward airspeed of the modular miniature unmanned aircraft itself.

The modular miniature unmanned aircraft configuration has developed into a scalable series of vehicles, ranging from 100 inches to 6 inches in length. In one preferred embodiment, the modular miniature unmanned aircraft with vectored thrust control has a full length of 24 inches. In a preferred embodiment, the 24" modular miniature unmanned aircraft vehicle has been equipped with a Paparazzi autopilot and has been used for flight tests in support of the Micro Air Vehicle Small Business Innovative Research grant.

Figure 1:
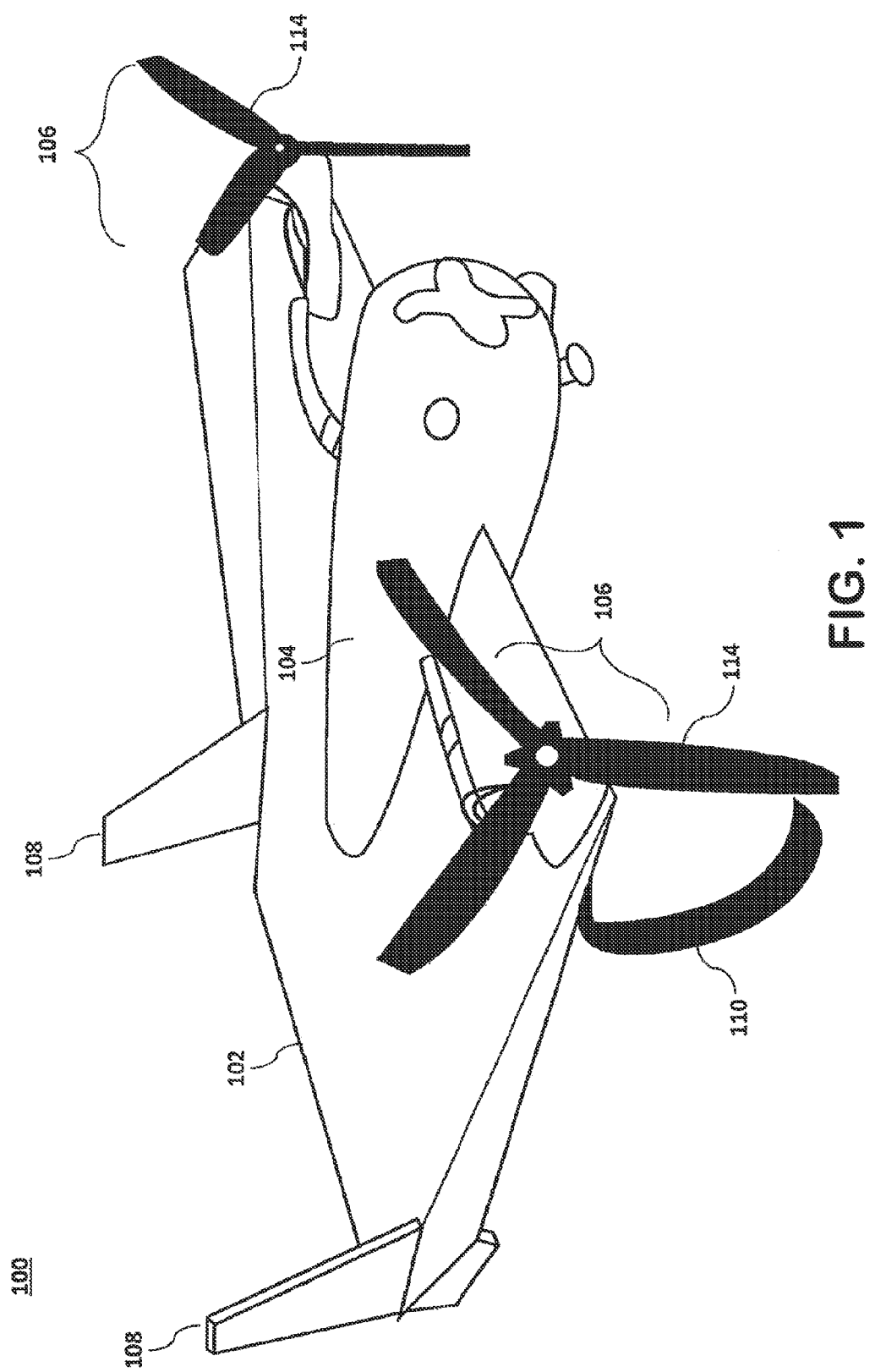
FIG. 1 illustrates a modular miniature unmanned aircraft with vectored thrust control according to a preferred embodiment of the present invention in a deployed configuration.
Figure 2:
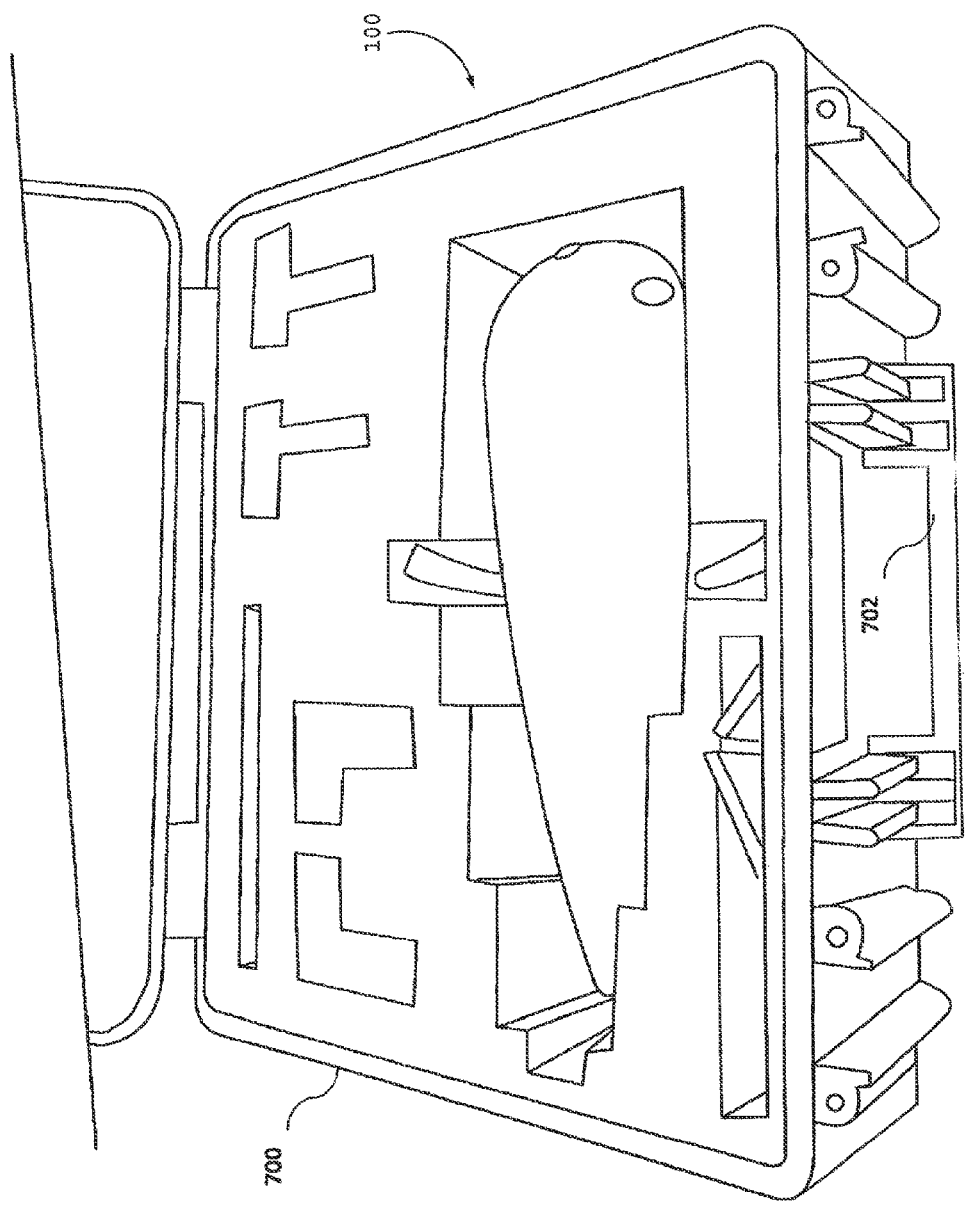
FIG. 2 illustrates a modular miniature unmanned aircraft with vectored thrust control according to a preferred embodiment of the present invention in a stowed configuration.

Referring to FIG. 1, an exemplary modular miniature unmanned aircraft 100 with vectored thrust control according to a preferred embodiment of the present invention is shown in a fully deployed configuration. Referring to FIG. 2, the exemplary modular miniature unmanned aircraft 100 is shown in a stowed configuration 700. According to a preferred embodiment of the present invention, the modular miniature unmanned aircraft provides a small modular unmanned vehicle with directly articulated electric motors for providing lateral and longitudinal control. The modular miniature unmanned aircraft includes a combined motor/actuator vector unit, which typically includes two thrust vectoring (T/V) modules. The T/V modules are deflected in unison for pitch control, and differentially for yaw control. Low mass propellers mitigate unwanted force coupling with motor deflection. The propellers 114 can operate in a counter-rotational mode to cancel gyroscopic effects and improve cruise efficiency due to a reduction in induced drag resulting by spinning in a direction such that the propeller wake opposes the spin direction of the normal tip vortex.

To provide vertical takeoff-and-landing (VTOL) capability, a tri-motor or quad motor configuration may be used. In a preferred embodiment of the invention, the modular miniature unmanned aircraft 100 features a modular vehicle architecture, which facilitates a disposable, folding airframe 102 and the use of mission-specific airframes. For example, a smaller planform could be used in gusty environments.

Figure 3:
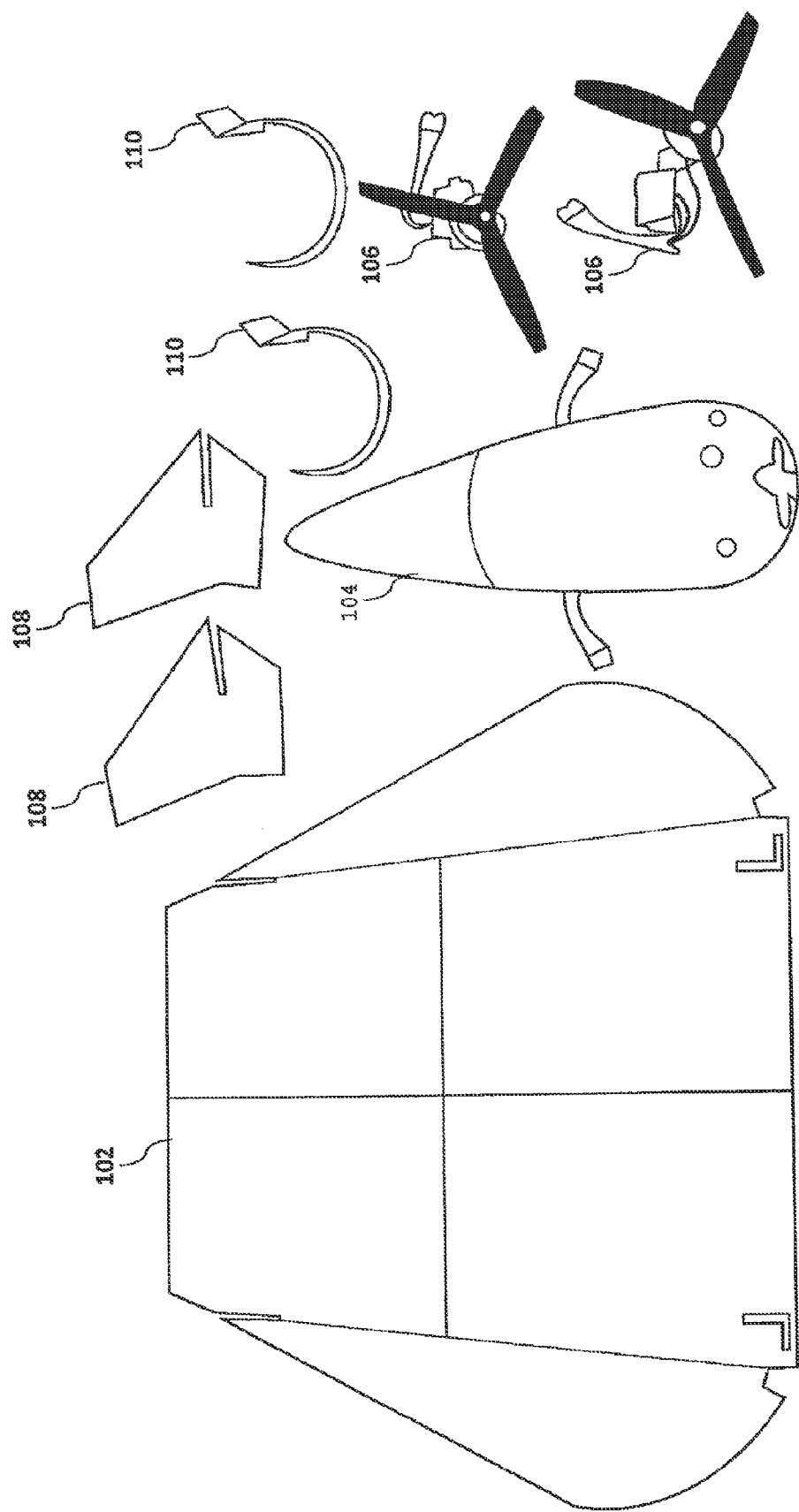
FIG. 3 illustrates eight major components of a disassembled modular miniature unmanned aircraft with vectored thrust control according to a preferred embodiment of the present invention.
Figure 4:
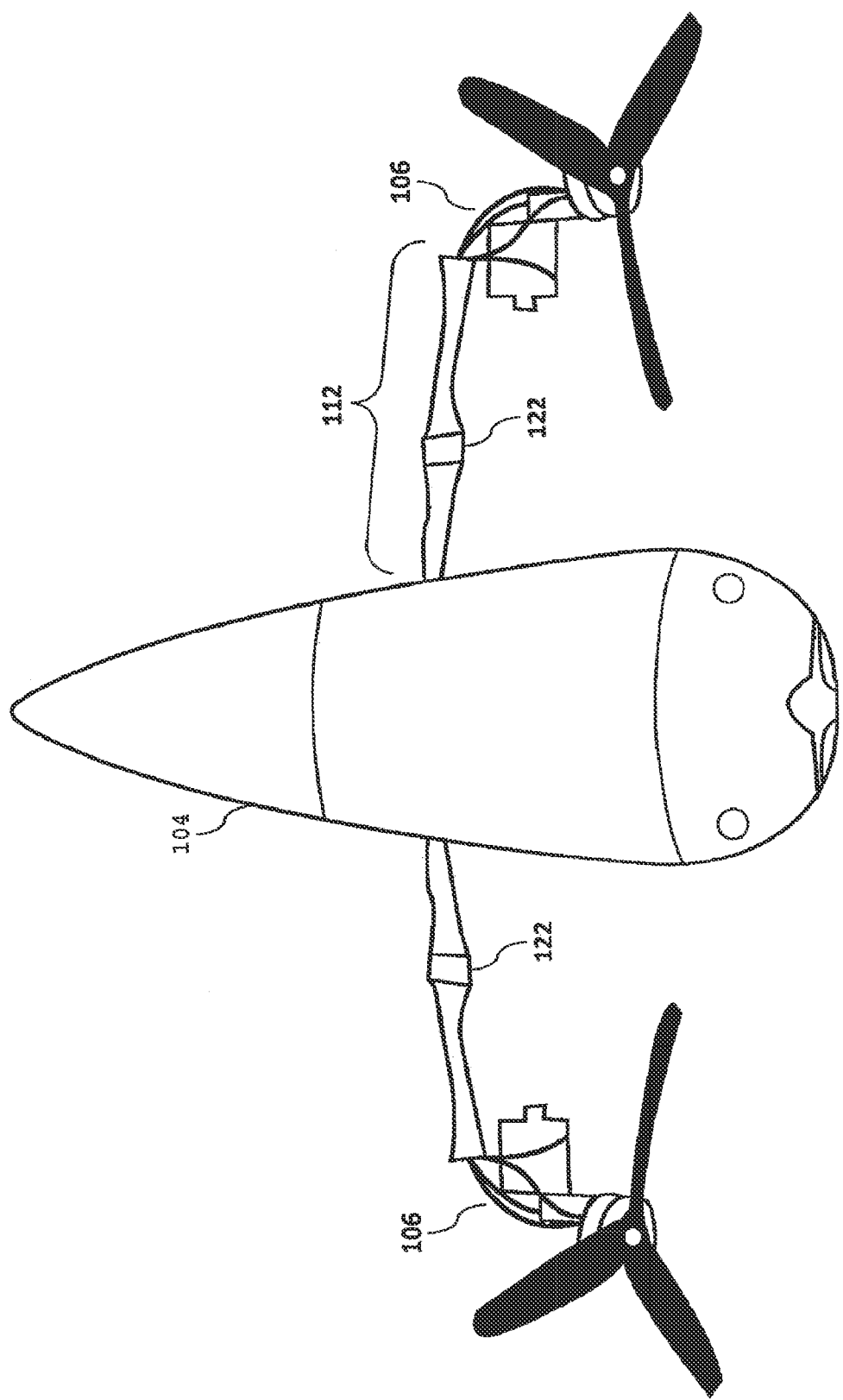
FIG. 4 illustrates an electronics module and two thrust vectoring modules that serve as components for a modular miniature unmanned aircraft with vectored thrust control according to a preferred embodiment of the present invention.

Referring to FIG. 3, in a preferred embodiment of the invention, the modular miniature unmanned aircraft with vectored thrust control comprises eight major components: the airframe 102, two fins 108, two combination dihedral braces/landing skids 110, an electronics module 104, and thrust vectoring (T/V) modules 106. Preferably, the airframe, fins, and skids are low cost disposable elements of the system. Referring also to FIG. 4, the electronics module 104 houses the vehicles avionics, propulsion battery, and sensor payload. The T/V modules 106 provide propulsive power and control forces. In a preferred embodiment of the invention, the electronics module 104 and T/V modules 106 contain all of the necessary equipment to power and control the air vehicle. As such, each of these three components can be easily removed and installed on a replacement or mission-specific airframe.

Figure 5B:
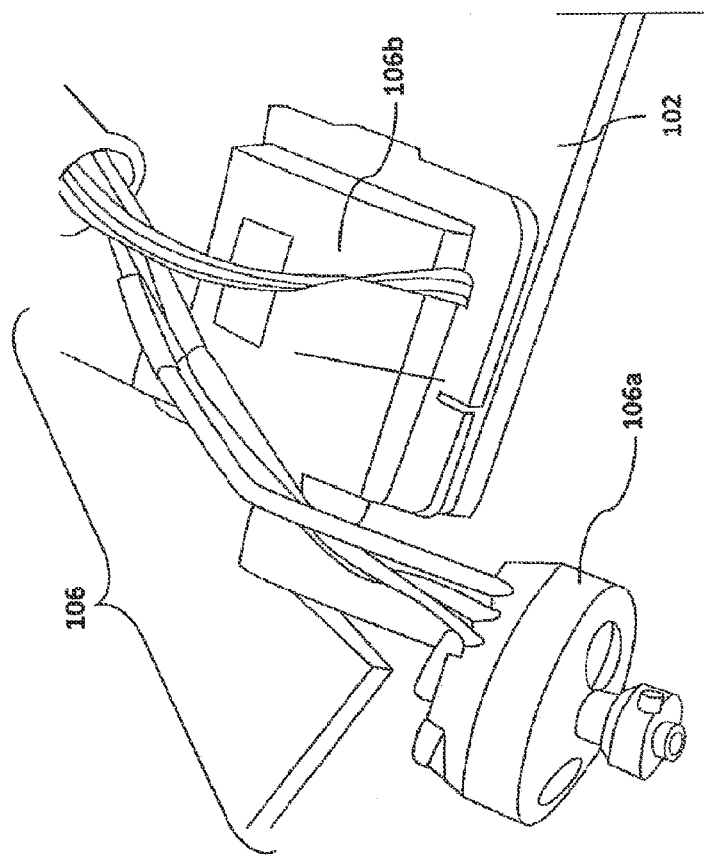
FIGS. 5a and 5b illustrate a thrust vectoring module for use as a component for a modular miniature unmanned aircraft with vectored thrust control according to preferred embodiment of the present invention.
Figure 5A:
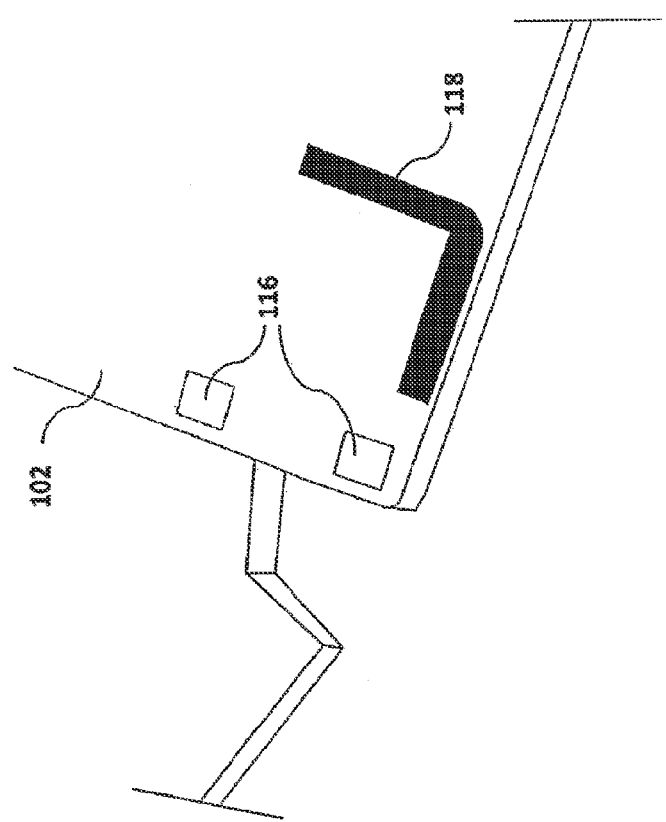

Referring to FIGS. 5a and 5b, the thrust vectoring modules 106 combine the vectoring servo 106b and electric motor 106a, shown in the left side of FIG. 5b, which are attached to the aircraft 100 by an integrated breakaway mount. In a preferred embodiment of the invention, magnets 116 are used to attach the T/V modules to the airframe. Anti-rotation brackets 118, shown in the right side of FIG. 5a are preferably used to resist thrust and torque loads, yet allow for the T/V modules to break free in the event of a ground impact.

Figure 6A:
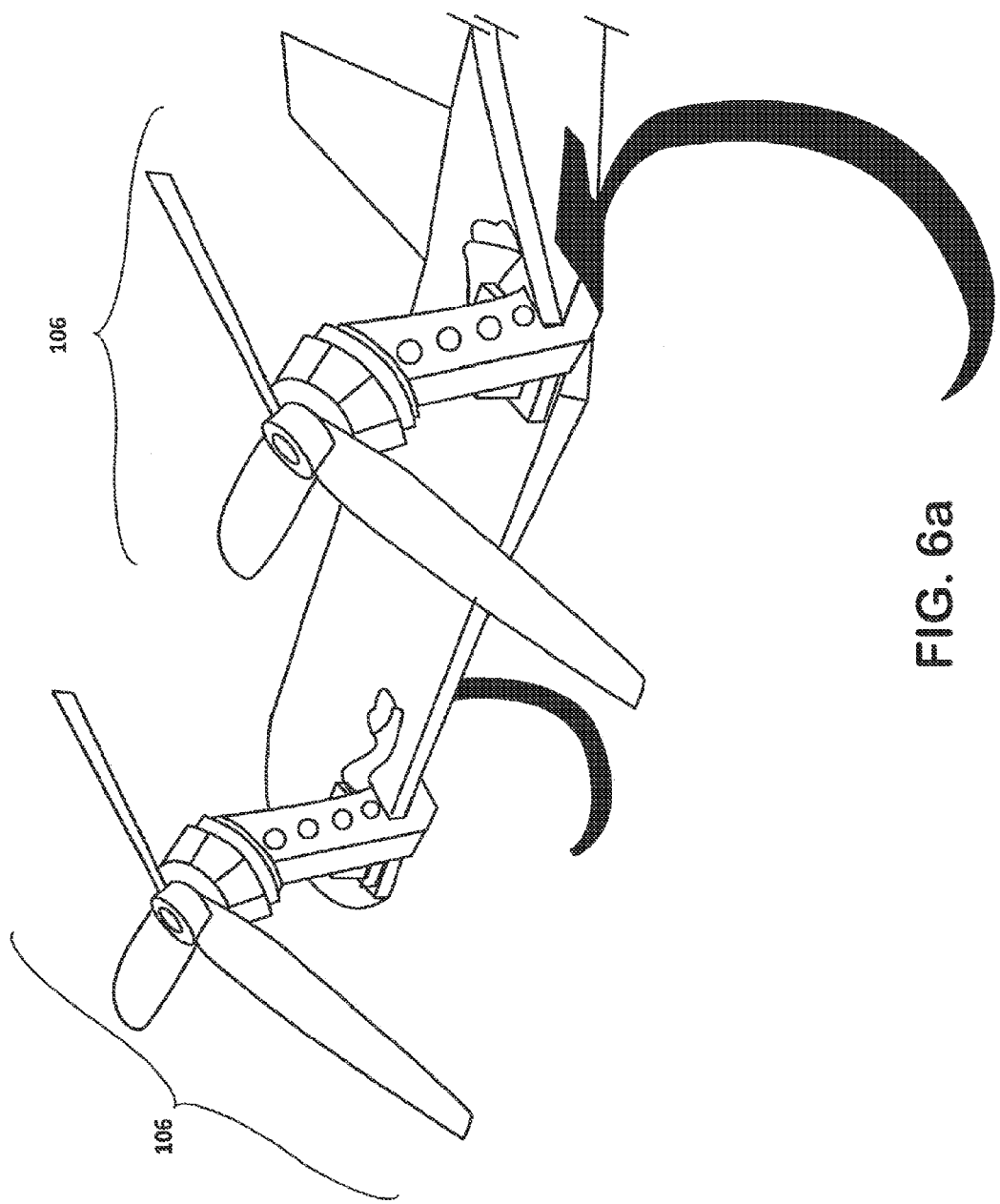
FIGS. 6a, 6b, 6c, and 6d illustrate four directional motions based on action by the thrust vectoring modules of a modular miniature unmanned aircraft with vectored thrust control according to a preferred embodiment of the present invention.
Figure 6B:
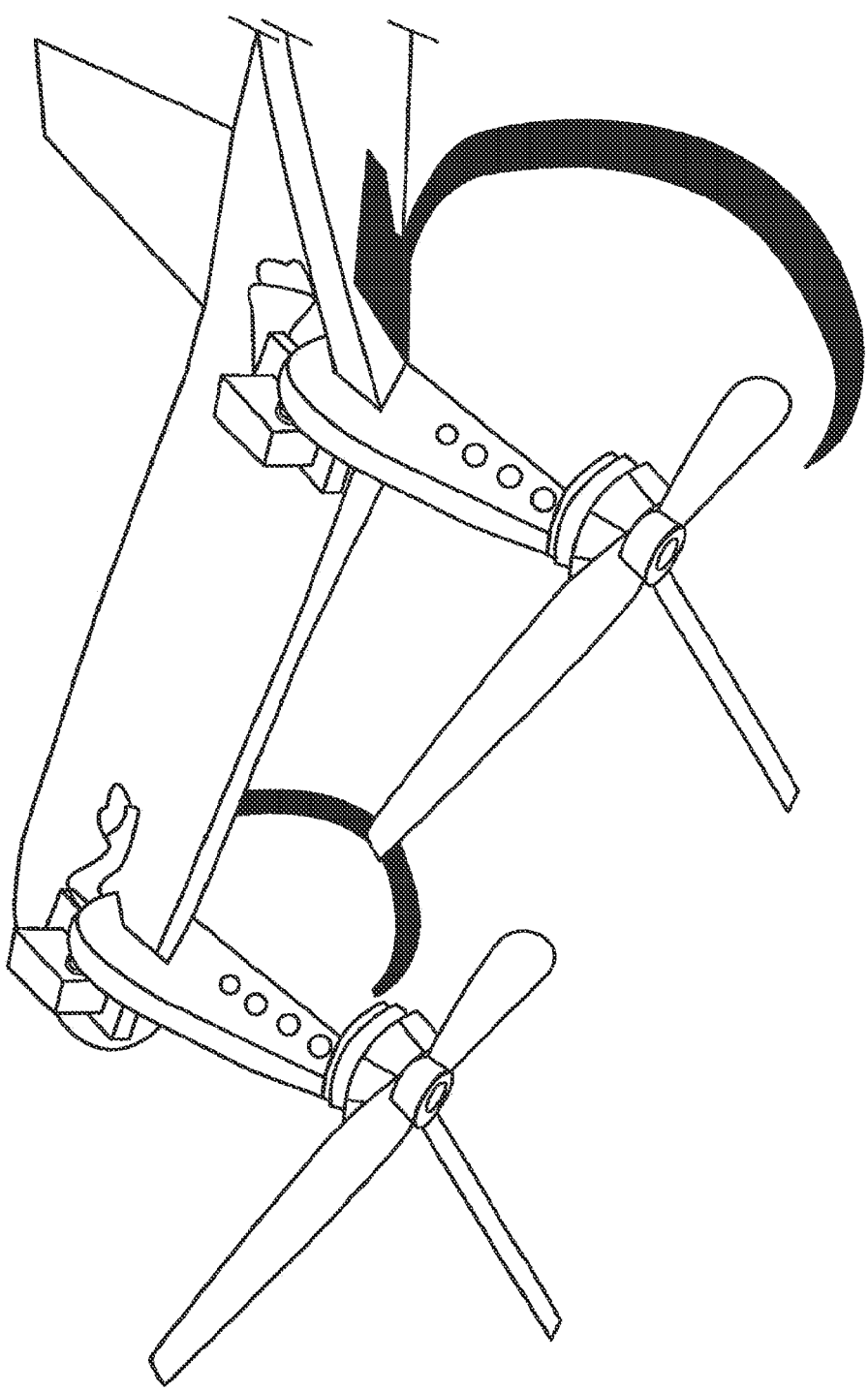
Figure 6C:
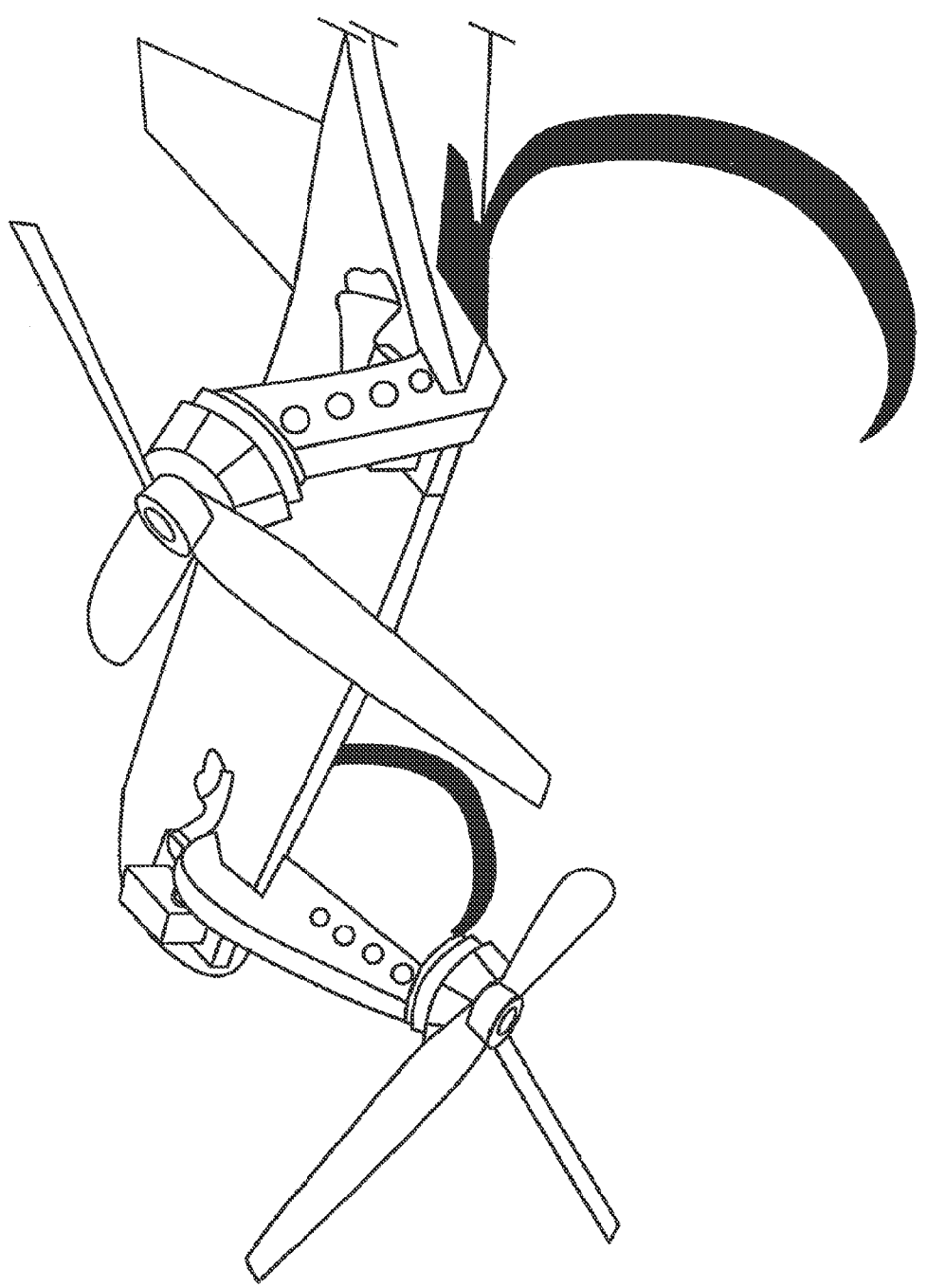
Figure 6D:
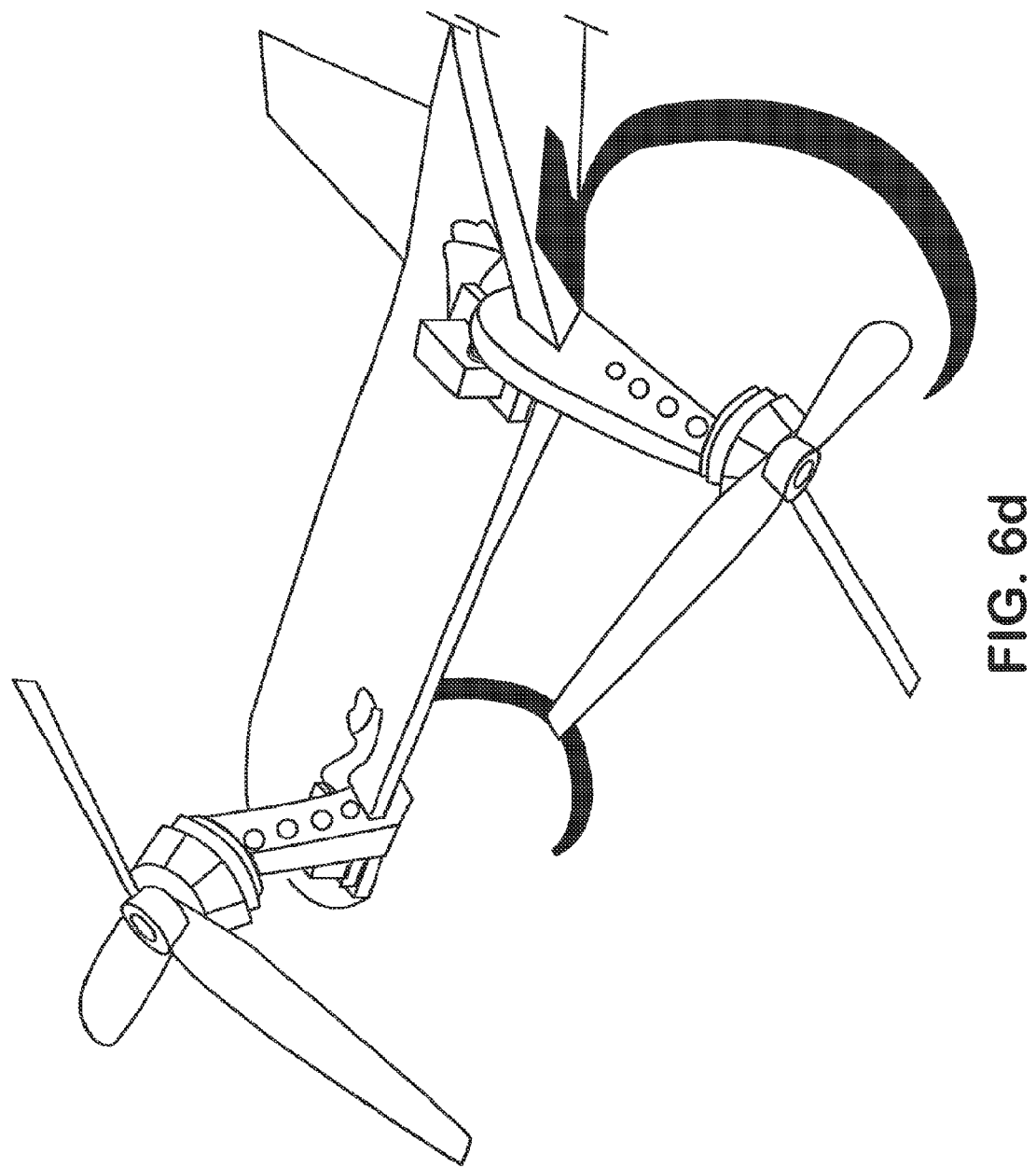

Referring to FIGS. 6a, 6b, 6c, and 6d in a preferred embodiment of the invention, lateral and longitudinal control is achieved solely through the use of the T/V modules 106. As illustrated in FIGS 6a and 6b, the T/V modules 106 move in unison for pitch control; and, as illustrated in FIGS. 6c and 6d, the T/V modules move differentially for roll control. Yaw control is achieved through differential thrust commands to the T/V modules.

Figure 7B:
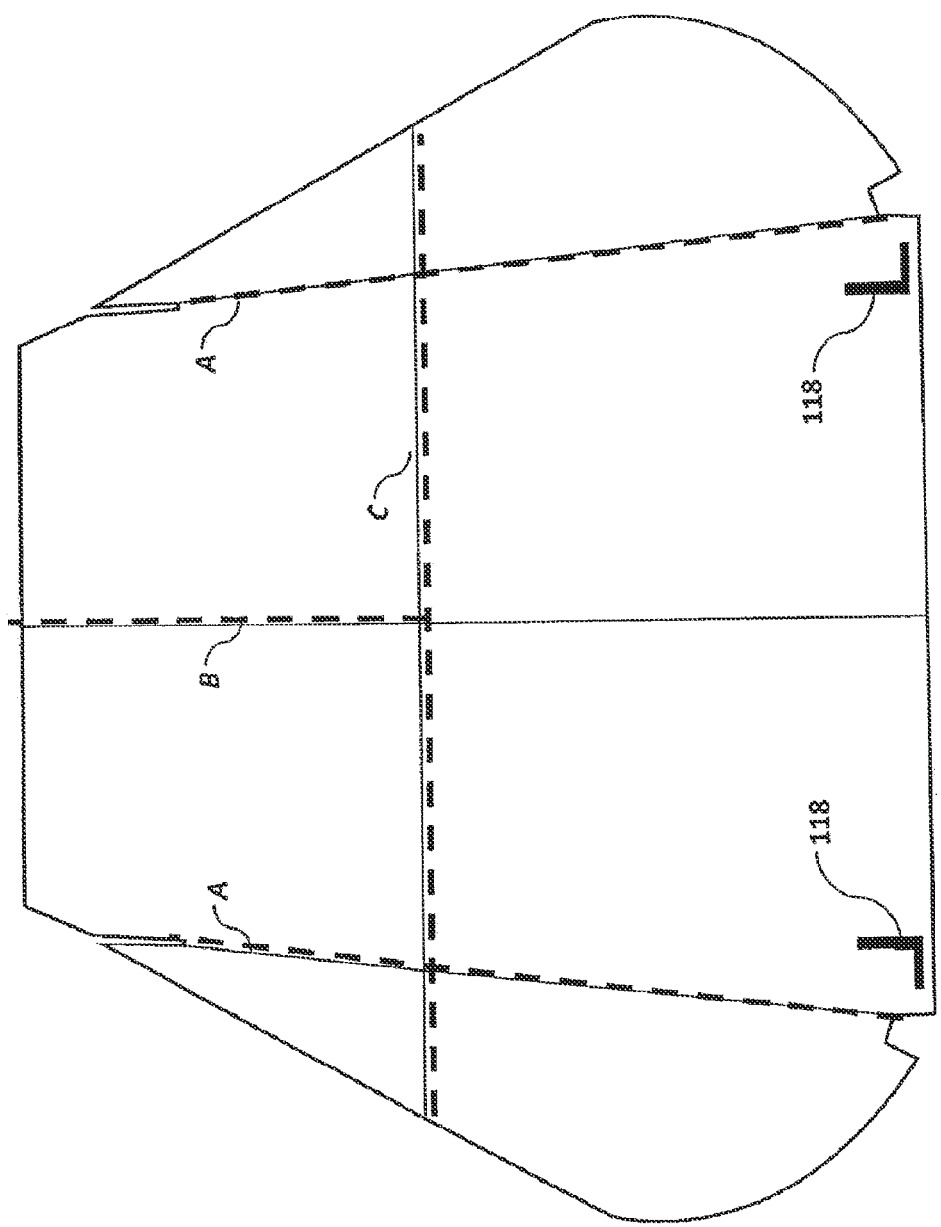
Figure 7C:
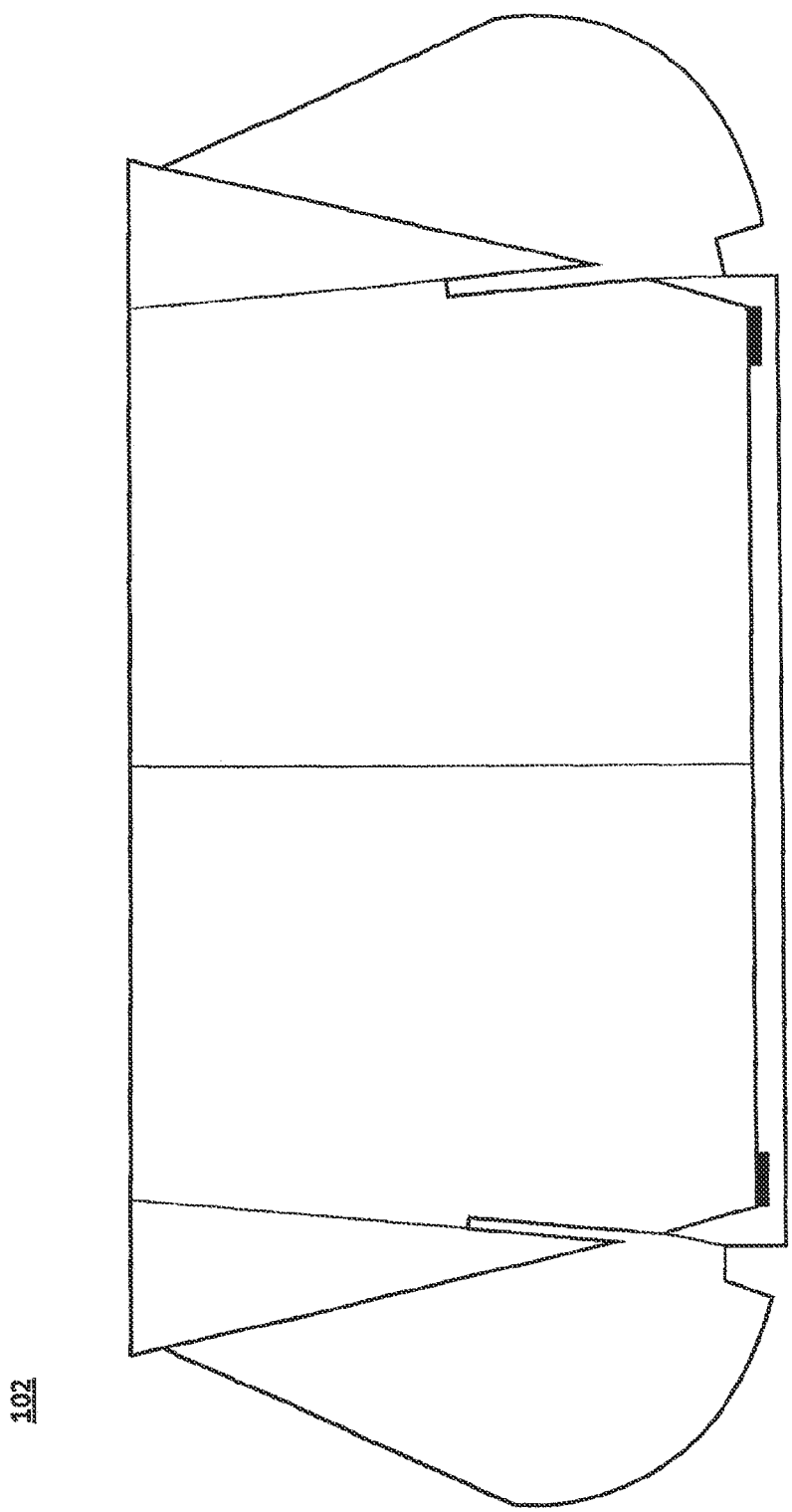
Figure 8D:
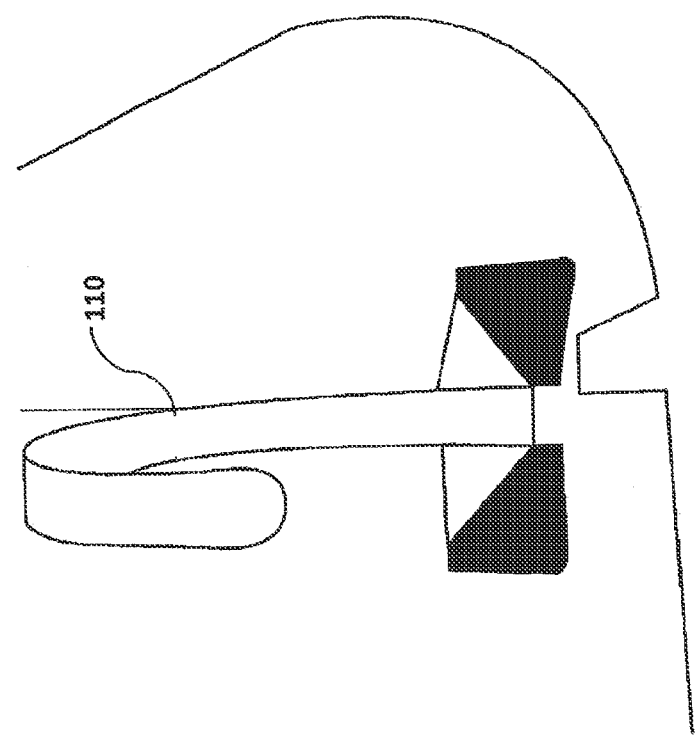
Figure 8C:
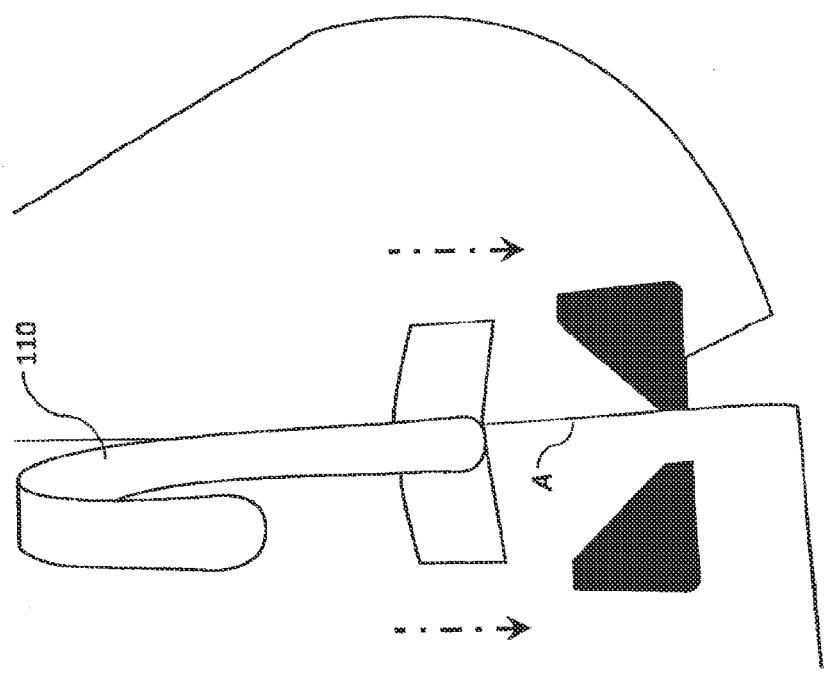

Referring to FIGS. 7a, 7b, 7c, and 7d, because the airframe 102 does not require control surfaces or other integrated systems, the airframe can be folded to significantly reduce the packed size of the air vehicle. The folding scheme includes four integrated hinges A, B, C, and D, as illustrated in FIG. 7b. Two dihedral hinges A and a chord-wise hinge B are located on the upper surface of the aircraft, and a centerline hinge C is located on the lower surface. When deflected, the tip dihedral hinge locks the chord-wise hinge, thereby minimizing the amount of hardware needed to rigidize the airframe, as in FIGS. 7c and 7d.

Referring to FIGS. 8a, 8b, 8c, and 8d, the landing skids 110, also referred to as dihedral braces, respectively lock the dihedral hinges A, and the centerline avionics/payload pod 104 locks the centerline hinge C. These are the only fasteners needed to hold the airframe in the deployed configuration.

Figure 9:
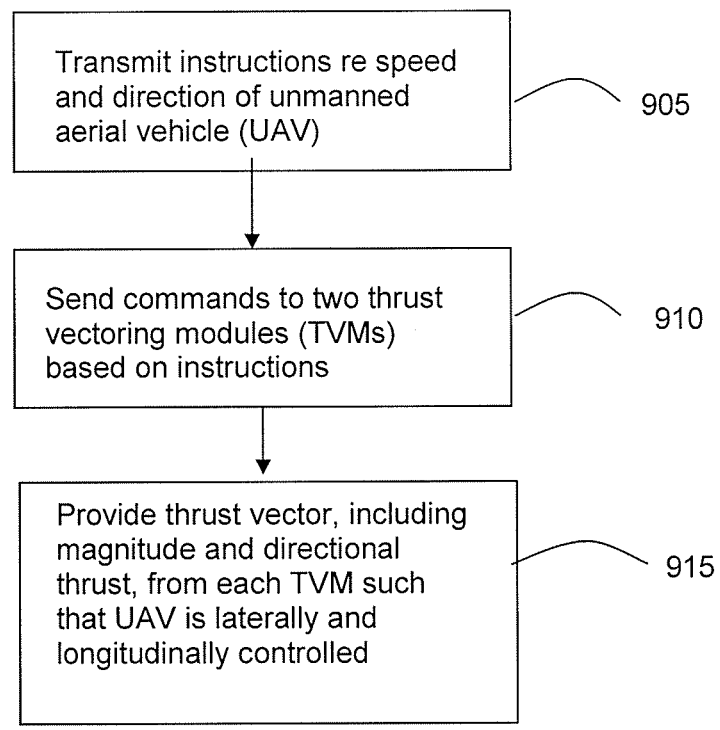
FIG. 9 illustrates a flow chart for a method of controlling a flight path of a modular miniature unmanned aircraft with vectored thrust control according to a preferred embodiment of the present invention.

Referring to FIG. 9, a flowchart 900 illustrates a method for controlling a flight path of an unmanned aerial vehicle (UAV), such as a modular miniature unmanned aircraft with vectored thrust control, according to a preferred embodiment of the invention. In the first step 905, instructions for controlling the speed and direction of the modular miniature unmanned aircraft are transmitted by a user to the electronics module. In the second step 910, the electronics module converts these instructions into commands which are sent to the two thrust vectoring modules. Finally, in the third step 915, the T/V modules provide thrust in the appropriate directions and magnitudes to cause the modular miniature unmanned aircraft to change direction, thereby controlling the flight path of the modular miniature unmanned aircraft both laterally and longitudinally.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. An aircraft for unmanned aviation, comprising:
an airframe having a fixed wing attached thereto;
a plurality of fins attached to a rear portion of the airframe;
at least a first thrust vectoring module and a second thrust vectoring module, the at least two thrust vectoring modules being configured to (i) provide lateral and longitudinal control to the aircraft by directly controlling a thrust vector, and (ii) to independently control pitch, roll, and yaw of the aircraft, each of the at least two thrust vectoring modules is attached to the fixed wing by an integrated non-destructive breakaway mount, each thrust vectoring module being independently articulable with respect to a portion of the fixed wing to which it is attached; and
an electronics module configured to provide commands to the at least two thrust vectoring modules, wherein the breakaway mount is capable of breaking away upon impact.

2. The aircraft of claim 1, wherein each of the at least two thrust vectoring modules comprises a directly articulated electrical motor.

3. The aircraft of claim 1, wherein the airframe is disposable and foldable into a compact, stowable configuration.

4. The aircraft of claim 1, wherein the aircraft is configured for executing a turn having a radius of less than or equal to one wing span over a range of airspeeds from zero to a maximum speed of the aircraft.

5. The aircraft of claim 4, wherein the aircraft is further configured for executing a turn having a radius of less than or equal to one wing span while in a post-stall condition.

6. The aircraft of claim 1, wherein the airframe comprises a mission-specific airframe.

7. The aircraft of claim 6, wherein the airframe further comprises a mission-specific airframe based on an atmospheric condition or a weather condition.

8. The aircraft of claim 1, wherein the non-destructive breakaway mount comprises a magnetic mount.

9. A control system for controlling a flight path of an unmanned aerial vehicle having an airframe with a fixed wing attached thereto, the system comprising:
at least a first thrust vectoring module and a second thrust vectoring module, the at least two thrust vectoring modules being configured to (i) provide lateral and longitudinal control to the vehicle by directly controlling a thrust vector, and (ii) to independently control pitch, roll, and yaw of the aircraft, each of the at least two thrust vectoring modules is attached to the fixed wing by an integrated non-destructive breakaway mount, each thrust vectoring module being independently articulable with respect to a portion of the fixed wing to which it is attached; and
an electronics module configured to provide commands to the at least two thrust vectoring modules based on instructions received from a user of the control system, wherein the breakaway mount is capable of breaking away upon impact.

10. The control system of claim 9, wherein each of the at least two thrust vectoring modules comprises a directly articulated electrical motor.

11. The control system of claim 9, wherein the control system is configured for enabling the vehicle to execute a turn having a radius of less than or equal to one wing span over a range of airspeeds from zero to a maximum speed of the vehicle.

12. The control system of claim 11, wherein the control system is further configured for enabling the vehicle to execute a turn having a radius of less than or equal to one wing span while in a post-stall condition.

13. The control system of claim 9, wherein the non-destructive breakaway mount comprises a magnetic mount.

14. A method for controlling an unmanned aerial vehicle having an airframe with a fixed wing attached thereto, the method comprising the steps of:
transmitting a control signal to an electronics module, the control signal including instructions for controlling a speed and a direction of the vehicle;
causing the electronics module to provide a command to each of at least a first thrust vectoring module and a second thrust vectoring module;
causing each of the at least first thrust vectoring module and second thrust vectoring module to provide thrust such that the vehicle is laterally and longitudinally controlled, each thrust vectoring module being independently articulable with respect to a portion of the fixed wing to which it is attached; and
using non-destructive breakaway mounts to cause the first and second thrust vectoring modules to break away from the fixed wing upon impact.

15. The method of claim 14, wherein the step of causing each of the at least first and second thrust vectoring modules to provide thrust further includes causing each of the at least first and second thrust vectoring modules to independently control a pitch, a roll, and a yaw of the vehicle.

16. The method of claim 14, wherein each of the at least two thrust vectoring modules comprises a directly articulated electrical motor.

17. The method of claim 14, wherein the step of causing each of the at least first thrust vectoring module and second thrust vectoring module to provide thrust such that the vehicle is laterally and longitudinally controlled further comprises enabling the vehicle to execute a turn having a radius of less than or equal to one wing span over a range of airspeeds from zero to a maximum speed of the vehicle.

18. The method of claim 17, wherein the step of enabling the vehicle to execute tight-radius high-speed turns over a wide range of airspeeds further comprises enabling the vehicle to execute a turn having a radius of less than or equal to one wing span while in a post-stall condition.

19. The method of claim 14, wherein the non-destructive breakaway mount comprises a magnetic mount.

\* \* \* \* \*